United States Patent [19]
Kinsey

[11] Patent Number: 6,110,548
[45] Date of Patent: Aug. 29, 2000

[54] EXTENDED LONG LIFE JUICE CARTON STRUCTURE AND METHOD OF CONSTRUCTION

[75] Inventor: Joe L. Kinsey, Irvington, Ala.

[73] Assignee: International Paper Company, Tuxedo, N.Y.

[21] Appl. No.: 09/010,832

[22] Filed: Jan. 22, 1998

Related U.S. Application Data

[63] Continuation of application No. 08/549,446, Oct. 27, 1995.

[51] Int. Cl.[7] .............................. B32B 29/00; B32B 27/00
[52] U.S. Cl. ........................ 428/34.2; 428/36.7; 428/219; 428/475.8; 428/476.1; 428/476.3; 428/479.6; 428/516; 428/518
[58] Field of Search .................................. 428/34.2, 34.3, 428/516, 518, 474.9, 476.1, 476.3, 479.6, 475.8, 36.6, 36.7, 219; 229/5.81, 5.84

[56] References Cited

U.S. PATENT DOCUMENTS

| | | | |
|---|---|---|---|
| 4,835,025 | 5/1989 | Thompson et al. | 428/34.2 |
| 4,859,513 | 8/1989 | Gibbons et al. | 428/34.2 |
| 4,880,701 | 11/1989 | Gibbons et al. | 428/34.2 |
| 4,888,222 | 12/1989 | Gibbons et al. | 428/34.2 |
| 4,921,733 | 5/1990 | Gibbons et al. | 428/34.2 |
| 4,929,476 | 5/1990 | Gibbons et al. | 428/34.2 |
| 4,940,612 | 7/1990 | Gibbons et al. | 428/34.2 |
| 4,950,510 | 8/1990 | Massouda | 428/34.2 |
| 4,981,739 | 1/1991 | Gibbons et al. | 428/34.2 |
| 4,983,431 | 1/1991 | Gibbons et al. | 428/34.2 |
| 5,084,352 | 1/1992 | Perce et al. | 428/412 |
| 5,116,649 | 5/1992 | Massouda | 428/34.2 |

OTHER PUBLICATIONS

*The Encyclopedia of Polymer Science and Engineering*, 2nd Ed., vol. 17, 1985, "Vinyl Alcohol Polymers", p. 186.

*Primary Examiner*—Rena L. Dye
*Attorney, Agent, or Firm*—Hoffman, Wasson & Gitler, PC; Michael J. Doyle

[57] ABSTRACT

An extend long life juice carton structure is provided which has low oxygen permeability, is leak free, has minimal flavor loss, and excellent bulge resistance and durability characteristics without sacrificing the ability to skive the side seam or use hydrogen peroxide as a sterilizing substance. The container structure has a polyamide polymer layer, a layer of ethylene vinyl alcohol copolymer with an ethylene comonomer content of 27–32 mole %, and a thin matte side layer polyolefin polymer.

12 Claims, 3 Drawing Sheets

EXTENDED LONG LIFE JUICE CARTON STRUCTURE AND METHOD OF CONSTRUCTION

The instant application is a continuation of copending application Ser. No. 08/549,446, filed Oct. 27, 1995.

BACKGROUND OF THE INVENTION

1. Field of the Invention

The present invention relates to an extended long life non-foil juice carton structure. More particularly, the present invention relates to a container which has low oxygen permeability, is leak free for at least 90 days, has a high degree of flavor retention, vitamin C protection, bulge resistance and durability characteristics without sacrificing the ability to skive the side seam of the carton blank or hydrogen peroxide sterilize the carton interior. The container structure includes a polyamide polymer layer, a high barrier ethylene vinyl alcohol copolymer layer, and a thin layer of polyolefin on the matte side of the laminate.

2. Description of the Prior Art

Heat sealable polyolefin polymers such as low density polyethylenes are well known for use as components of current paperboard food and/or non-food packages and have only minimal resistance to the transmission of oxygen. Pinholes, cuts, score line cracks or channels, existent in conventional packaging and cartons, create additional leakage sites. It is well known that impermeable materials such as aluminum foil, polar brittle materials such as polyacrylonitriles, polyvinylidene chlorides, polyvinyl chlorides, etc., provide varying degrees of barrier protection against the transfer of oxygen. However, all these materials lack the requisite strength at high rates of deformation, namely stress cracking resistance during scoring, package formation and distribution abuse to provide a resultant low permeability structure. In addition, leakage through uncaulked channels of the carton in the top, bottom and side seam have likewise resulted in poor carton performance.

The existing commercial structures for a paperboard carton for liquid and solid, food and non-food, products have employed an easily heat-sealable barrier laminate composed of a paperboard substrate and a foil oxygen barrier layer, both being sandwiched between two thick layers of polyolefin polymers such as low density polyethylene (LDPE). The polyolefin polymer is a relatively inexpensive heat-sealable moisture barrier material. A problem with conventional structures is that the foil layer, which acts as the barrier to the transmission of oxygen into and out of the carton, cracks during blank conversion, carton formation, and package distribution stages.

Bending and folding occurring during the formation of a gable "type" top, flat "type" top, or other folded heat-sealable top closure, and fin-sealed, or other conventional folded bottom puts excessive amounts of local stress on the thin foil or other oxygen barrier layer and, as typically results, cracks and pinholes appear.

To date there have been no economically attractive commercially available non-foil paperboard packages which consistently approach the oxygen impermeability of glass or metal containers. An object of the present invention is to produce an extended long life, low oxygen permeable, leak free container laminate structure such as a paperboard based package or carton that prevents the transmission of gases therethrough, and in addition, prevents the escape of flavor components, or the ingress of microbiological contaminates. A further object of the present invention is to produce such a package that is economical on a per-package cost basis, is fundamentally compatible with existing converting machinery, and can be formed, filled and sealed at economically high speeds using conventional packaging machine temperatures, pressures and dwell times.

| Gibbons '222 FIG. 2 | # | Gibbons '222 FIG. 3 | # | Structure of the Present Invention | Structure of the Present Invention Patent Description |
|---|---|---|---|---|---|
| LDPE | 24 | LDPE | 48 | LDPE | LDPE |
| Substrate | 26 | Substrate | 50 | Substrate | Substrate |
| Caulk | 28 | | | | |
| Oxygen Barrier | 30 | Abuse Resistant | 52 | Nylon | Polyamide |
| Caulk | 32 | | | Tie Layer | |
| LDPE | 34 | | | LDPE | |
| LDPE | 36 | Caulk | 54 | LDPE | |
| Tie Layer | 38 | Tie Layer | 56 | Tie Layer | Tie Layer |
| EVOH | 40 | Oxygen Barrier | 58 | HBEVOH | HBEVOH |
| Tie Layer | 42 | Tie Layer | 60 | Tie Layer (thin) | Tie Layer (thin) |
| LDPE | 44 | Caulk | 62 | LDPE (thin) | Olefin (thin) |
| LDPE | 46 | LDPE | 64 | | |

Some prior structures such as U.S. Pat. No. 4,88,222, (Gibbons et al) does not suggest or teach that HBEVOH can be used as an oxygen barrier. The structure set forth in FIG. 2 of the Gibbons et al '222 patent shows an oxygen barrier which can be nylon which would provide thermal resistance and mechanical strength and durability. The FIG. 3 structure does not show a thin tie layer and a thin LDPE product contact layer interior to the HBEVOH. The Gibbons et al '222 patent does not teach or suggest the provision of a very thin product contact layer which prevents flavor scalping. In fact, Gibbons et al '222 patent suggests coating weights for the last two LDPE layers of 10 and 22 pounds per 3,000 square feet. The present invention recites thin tie layers and product contact LDPE layer. There is no teaching or suggestion of such a feature in Gibbons et al '222. One of ordinary skill in the art would not replace the adhesive EVOH layer disclosed in Gibbons et al '222 which functions as a tie layer with the High Barrier EVOH. Gibbons et al '222 utilizes a foil layer to act as the oxygen or moisture barrier layer.

Gibbons et al '222 discloses an adhesive-type EVOH having a coating weight of 12 pounds per 3,000 square feet, which is not high barrier EVOH. Consequently, an EVOH barrier layer as recited in the present application, having a coating weight of at most 4 pounds per 3,000 square feet would be inoperable in the Gibbons et al '222 structure.

Another object of the present invention is to provide a container laminate structure, such as a gable top carton structure, for extended long life (ELL) packaging of foods such as juice.

Yet another object of the present invention is to provide a non-foil container laminate structure with a long shelf life which can be sterilized using hydrogen peroxide ($H_2O_2$), which scalps very little flavor oil, which can be skived and side seamed, and which has superior durability and bulge resistance performance. The structure will have low oxygen permeability and prevent the ingress of microbiological contaminates.

SUMMARY OF THE INVENTION

These and other deficiencies of the prior art are addressed by the present invention which is directed to an extended long life package or carton and a method of making the carton which has a polyolefin polymer layer, such as polyethylene polymers on the matte, or product side, thereby permitting sterilization with hydrogen peroxide. The package has a high barrier ethylene vinyl alcohol copolymer layer, which contains approximately 29 mole % ethylene comonomers in the copolymer, along with a thin tie layer and thin polyolefin polymer layer, such as low density polyethylene, to minimize scalping of the flavor oil to less than 10%. The provision of the thin tie and polyolefin polymer layers on the matte side of the structure ensure that the side seams of the structure can be skived with standard skiving techniques.

BRIEF DESCRIPTION OF THE DRAWINGS

These and other attributes of the present invention will be described with respect to the following drawings in which.

DETAILED DESCRIPTION OF THE INVENTION

Figure 1:
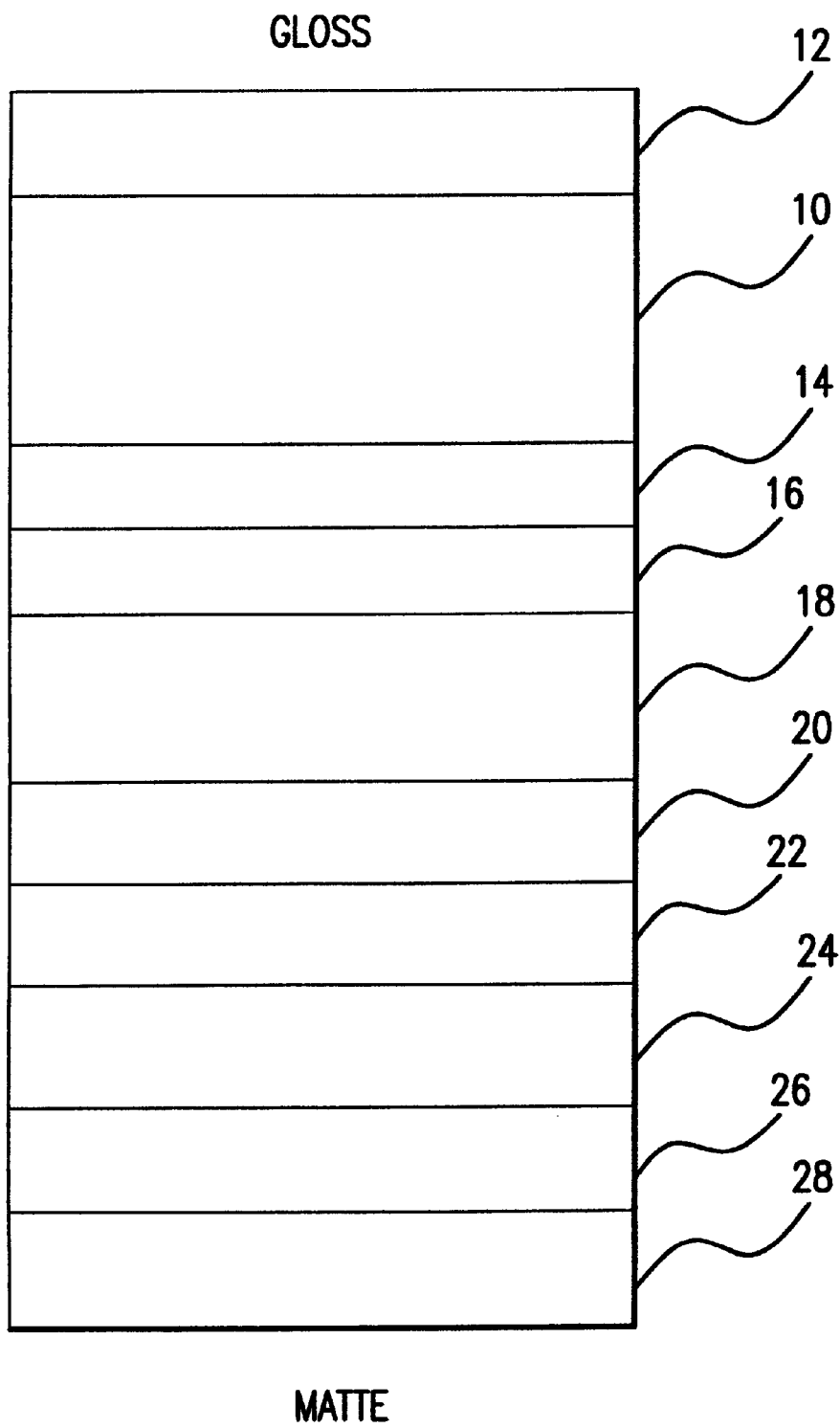
FIG. 1 is a cross-sectional elevation of the preferred embodiment of the laminate of the present invention.

The preferred embodiment of the present invention is for an extended long life, low oxygen permeable leak free laminate structure as shown in FIG. 1. All weights are expressed in pounds per 3,000 square feet. The preferred structure 5 has a paperboard substrate 10 with a weight 100–400 lbs, to which is applied on one side a coating of polyolefin polymer layer 12 such as low density polyethylene, linear low density polyethylene, or a blend thereof, in a coating weight of between 5–20 lbs and preferably about 12.0 lbs. Layer 12 is the "gloss" layer which contacts the atmosphere. On the underside or interior portion of the substrate 10 is a polyamide polymer layer 14 which has a coating weight of between 2–20 lbs. and preferably about 5 lbs. The polyamide polymer layer can be, but is not limited to, NYLON 6, NYLON 66, NYLON 10, NYLON 6–10, NYLON 12, Amorphous NYLONS, and other suitable polyamides. The underside or interior of the polyolefin polymer layer 14 has a tie layer 16 coated thereon. The tie layer has a coating weight of between 0.5–7 lbs and is preferably about 1.5 lbs. A polyolefin polymer layer 18 is applied to the underside or interior of the tie layer 16, and has a coating weight of between 6–30 lb.s and is preferably approximately 18 lbs.

The polyolefin polymer layer 18 has another polyolefin polymer layer 20 on its underside or interior, which has a coating weight of between 1–7 lbs and is preferably about 4 lbs. A second tie layer 22 is disposed on the underside of the polyolefin polymer layer 20, and has a coating weight of between 0.5–5 lbs. and is preferably approximately 1.5 lbs. A high barrier ethylene vinyl alcohol copolymer layer 24, having a coating weight of between 0.5–5 lbs and is preferably approximately 2 lbs., is disposed on the underside or interior of the second tie layer 22. The underside or interior of the high barrier ethylene vinyl alcohol copolymer layer 24 has a third tie layer 26, which has a coating weight of between 0.5–5 lbs and is preferably approximately 1.5 lbs. Finally a layer of polyolefin polymer 28 is disposed on the matte, or product side, on the underside of the tie layer 26. The matte side polyolefin polymer layer 28 has a coating weight of between 1–7 lbs and is preferably approximately 4 lbs.

The outer gloss and inner matte side layers of the laminate are both polyolefin polymer layers 12 and 28, respectively. By using polyolefin polymer as both the matte and gloss side layers 28 and 12, contact between the sterilizing hydrogen peroxide and the ethylene vinyl alcohol copolymer is prevented, the polyolefin polymer does not react adversely with hydrogen peroxide, and thus allows the laminate 5 to meet FDA requirements. Since hydrogen peroxide is the sterilizing agent of choice, the construction of the present invention is desirable over the conventional structures. Hydrogen peroxide is the most effective substance for sterilization to eliminate microbiological contamination, and meets FDA requirements.

The use of the high barrier ethylene vinyl alcohol copolymer layer 24 in conjunction with the tie layer 26 and polyolefin polymer layer 28 minimizes the loss of flavor oil. Trials of the laminate structure indicate that the flavor loss of the structure 5 was less than 10% over a period of at least 90 days, which is considered a long shelf life, and was closer to 6% total flavor loss with orange juice. Conventional ethylene vinyl alcohol copolymer layers have 44 mole % ethylene comonomer in the copolymer. The high barrier ethylene vinyl alcohol copolymer layer 24 of the present invention has an ethylene comonomer content of between 27–32 mole %, and approximately 29 mole % being preferred.

Conventional cartons utilize an ethylene vinyl alcohol copolymer layer having 44 mole % ethylene comonomer content, and provide about 5–6 weeks of shelf life. For such cartons to achieve comparable oxygen impermeability to the present invention, the thickness of such layers of ethylene vinyl alcohol copolymer must be increased at lest two to threefold. Correspondingly, the cost of such cartons increases, and for most purposes makes such cartons economically unfeasible.

The present invention employs an extrusion coated high barrier ethylene vinyl alcohol copolymer layer having an ethylene comonomer content of 29 mole %. The high barrier ethylene vinyl alcohol copolymer layer 24 incorporated into the laminate 5 results in a container having the desired extended long shelf life of at least 90 days. In addition, the layer 24 is approximately one half the thickness of the conventional ethylene vinyl alcohol copolymer layer having 44 mole % ethylene comonomer. Thus the laminate of the present invention has a longer shelf life, at least 90 days, and is less expensive than conventional laminates. For the conventional ethylene vinyl alcohol copolymer layer to achieve comparable oxygen impermeability, it would have to be 2–3 times thicker. Such a construction is not economically feasible.

Figure 3:
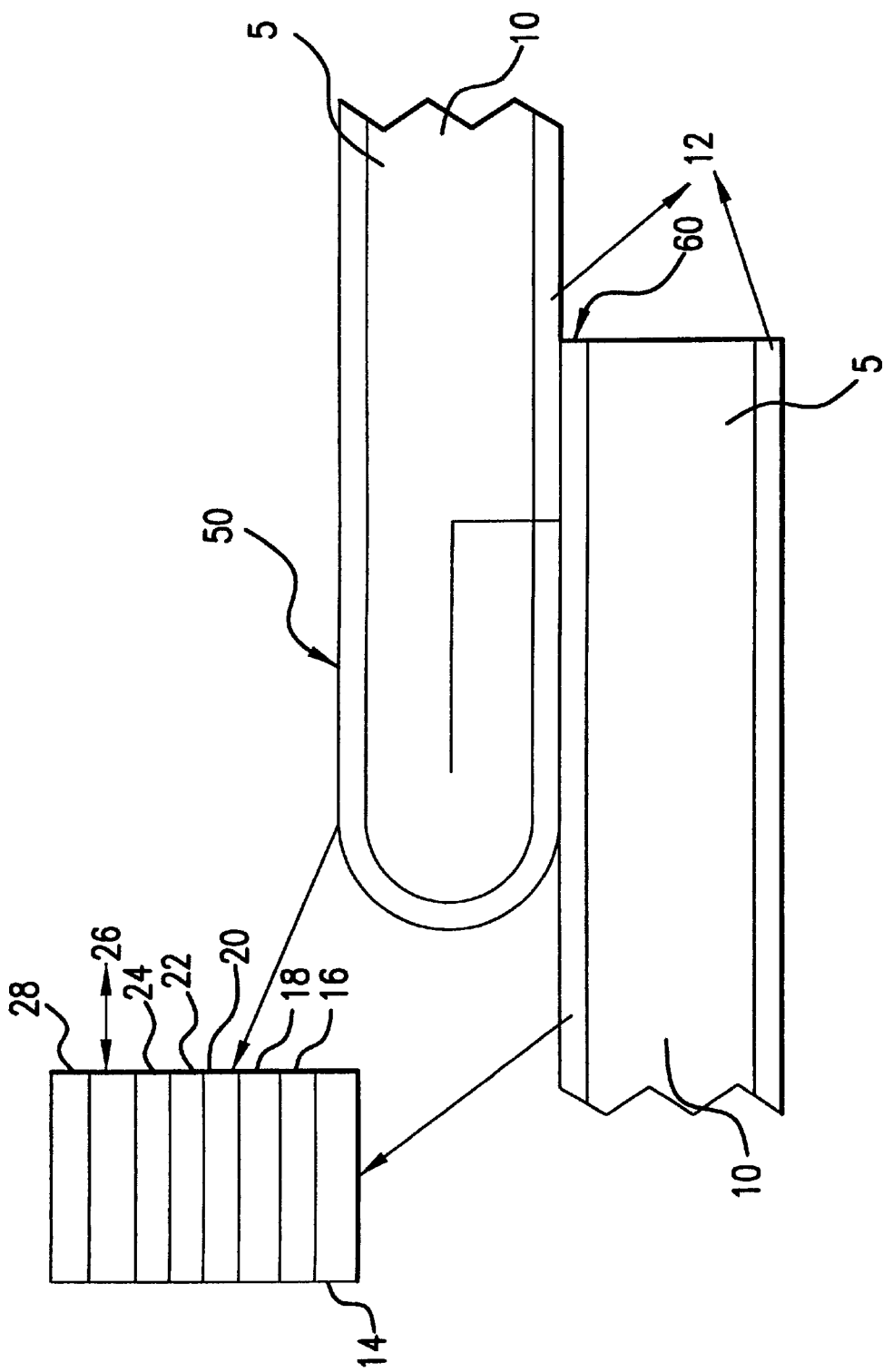
FIG. 3 is a cross-sectional elevation of the laminate, shown in FIG. 1, in a skived condition.

In the formation of the preferred containers from the laminate 5, the side seams are to be skived. Skiving is a method of joining the carton side seams so that the paperboard edges of the structure are not exposed to liquid contents to prevent wicking into the laminate. The laminate is manipulated so that it overlaps itself at various locations. The laminate is folded, as shown in FIG. 3, so that the paperboard edges do not contact the container contents. The inner side 50 of the laminate 5 has approximately one half of its thickness removed near the end of the laminate, so that it can be folded upon itself. This ensures only polyolefin polymer contacts the contents, and contacts the outer side 60. In order to successfully skive the laminate, one must remain aware that a polar polymer will not seal to itself when heated with direct flame impingement, only non-polar polymers will. Polyolefin polymers, such as low density polyethylene, linear low density polyethylene, or a blend thereof, are non-polar and work well for skiving purposes.

For this reason, the tie layer 26 and polyolefin polymer layer 28 are utilized on the matte side. The layers 26 and 28 are relatively thin. For example, the polyolefin polymer layer usually has a coating weight of 10–12 lbs. By providing the layers 26 and 28 the side seams of the laminate 5 can be skived, since polyolefin polymer can be sealed to itself using flame impingement heating.

The polyolefin polymer layer 14 is provided mostly for mechanical strength and thermal resistance to thereby improve the durability and bulge resistance performance of the laminate 5. The polyolefin polymer layer 18 acts as a caulking layer, so that the layer 18 "melts" to some extent during heating to fill channels that form when the laminate is folded to form a package. The tie layers 16 and 22 could conceivably be removed without departing from the spirit of the present invention.

Figure 2:
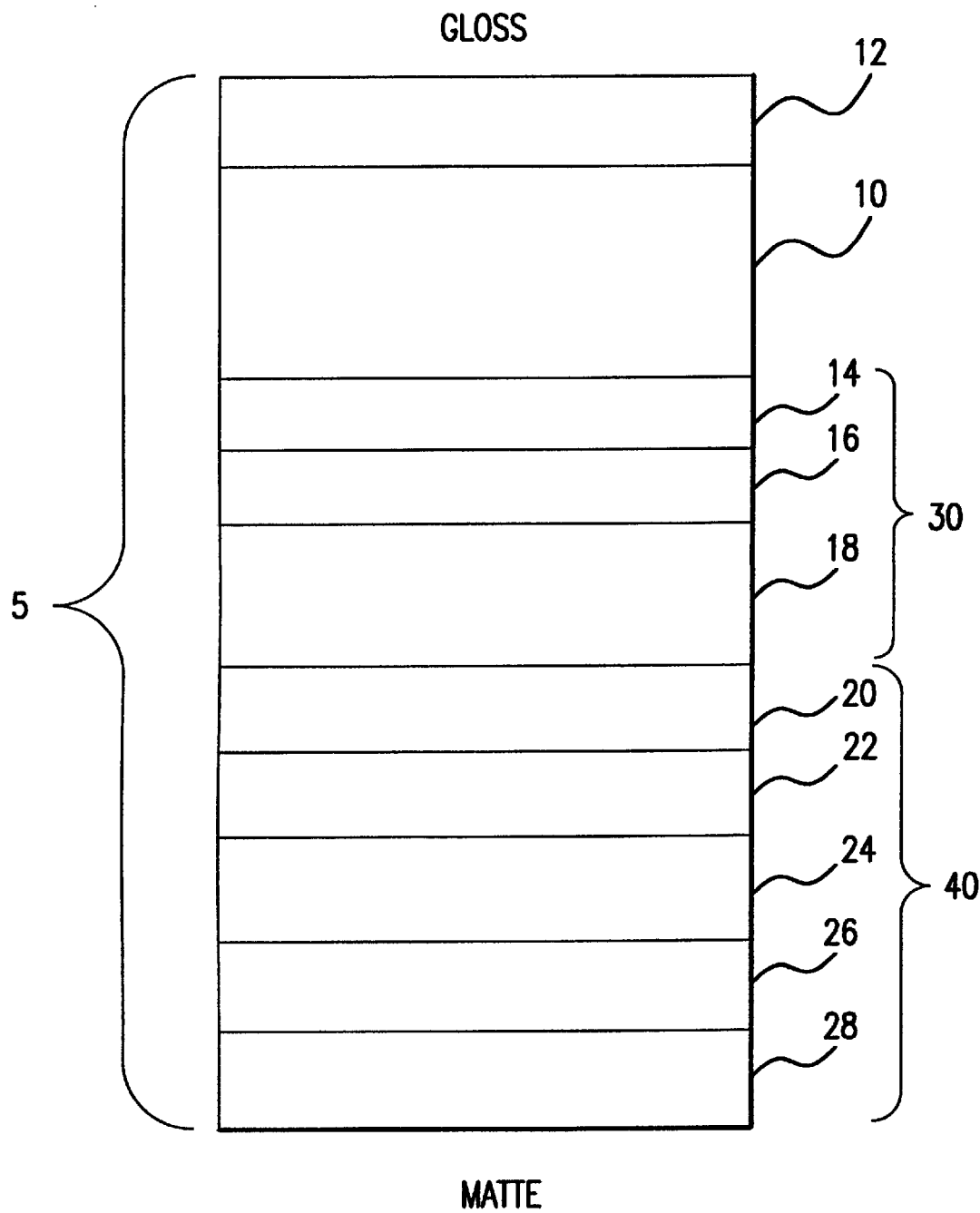
FIG. 2 is a cross-sectional elevation of the preferred embodiment of the laminate shown in FIG. 1, showing a possible order of constructing the laminate.

Referring to FIG. 2, the polyolefin polymer layer 12 is disposed on the substrate 10. The polyamide polymer layer 14, tie layer 16 and polyolefin polymer 18 are then produced as a coextrusion 30, and disposed on a second surface of substrate 10. The polyolefin polymer layer 20, tie layer 22, high barrier ethylene vinyl alcohol copolymer layer 24, tie layer 26 and polyolefin polymer layer 28 are then produced as coextrusion 40 and disposed on the coextrusion 30 to form the laminate 5. While the foregoing is one method of producing the laminate 5, other methods can be employed. The adjacent polyolefin polymer layers 18 and 20 could be a single polyolefin polymer layer. The critical layer for achieving the desired performance characteristics of the present invention have been discussed previously. The remaining tie and polyolefin polymer layers are provided to aid in the handling and production of the coextrusions and to provide the desired amount of material for the laminate 5. Such layers can be replaced or eliminated as needed as long as the laminate retains the proper amount of material to maintain the desired performance characteristics.

Having described several embodiments of the carton structure in accordance with the present invention, it is believed that other modifications, variations and changes will be suggested to those skilled in the art in view of the description set forth above. It is therefor to be understood that all such variations, modifications and changes are believed to fall within the scope of the invention as defined in the appended claims.

What is claimed is:

1. A container laminate structure consisting essentially of:
    a substrate having inner and outer surfaces;
    an outer layer of heat-sealable polymer material coated on said outer surface of said substrate;
    a polyamide polymer layer disposed on said inner surface of said substrate to provide mechanical strength and thermal resistance and improved durability to said laminate;
    a layer of high barrier ethylene vinyl alcohol copolymer disposed interior to said polyamide polymer layer, for preventing scalping of flavor oil from contents of said container, said layer of high barrier ethylene vinyl alcohol copolymer having a coating weight between 0.5–4 lbs. per 3,000 square feet; and
    a thin tie layer coated on an inner surface of said high barrier ethylene vinyl alcohol copolymer layer and a thin layer of heat-sealable polymer material coated on said thin tie layer to form an inner surface of said container, and an enabling skiving of side seams of said container and sterilizing of said laminate with hydrogen peroxide,
        wherein said high barrier ethylene vinyl alcohol copolymer layer is 27–32 mole % ethylene comonomer.

2. A container laminate structure as recited in claim 1, wherein said substrate is paperboard.

3. A container laminate structure as recited in claim 1, wherein said outer layer of heat-sealable polymer material and said thin layer of heat-sealable polymer material comprise one of low density polyethylene, linear low density polyethylene, or a blend thereof.

4. A container laminate structure as recited in claim 1, further consisting of a tie layer disposed on an inner surface of said polyamide polymer layer.

5. A container laminate structure as recited in claim 4, further consisting of: at least one layer of polyolefin polymer on an inner surface of said tie layer.

6. A container laminate structure as recited in claim 5, further consisting of: a second tie layer disposed on an inner surface of said at least one polyolefin polymer layer, and wherein said high barrier ethylene vinyl alcohol copolymer layer is disposed on an inner surface of said second tie layer.

7. A container laminate structure consisting essentially of:
    a paperboard substrate having inner and outer surface; a linear low density polyethylene or a blend thereof, coated on said outer surface of said substrate;
    a polyamide polymer disposed on said inner surface of said substrate to provide mechanical strength and thermal resistance, and improve durability to said laminate;
    a layer of high barrier ethylene vinyl alcohol copolymer disposed interior to said polyamide polymer layer, for preventing scalping of flavor oil from contents of said container said layer of high barrier ethylene vinyl alcohol copolymer having a coating weight between 0.5–4 lbs. per 3,000 square feet; and
    a thin tie layer coated on an inner surface of said high barrier ethylene vinyl alcohol copolymer layer and a thin polyolefin polymer layer coated on said thin tie layer, to form an inner surface of said container, and enable skiving of said container and sterilizing of said laminate with hydrogen peroxide,
        wherein said high barrier ethylene vinyl alcohol copolymer layer is 27–32 mole % ethylene comonomer.

8. A container laminate structure as recited in claim 7, further consisting essentially of a tie layer disposed on an inner surface of said polyamide polymer layer.

9. A container laminate structure as recited in claim 7, further consisting essentially of at least one polyolefin polymer layer on an inner surface of said tie layer; and a second tie layer disposed on an inner surface of said at least one polyolefin polymer layer, and wherein said layer of high barrier ethylene vinyl alcohol copolymer is disposed on an inner surface of said second tie layer.

10. A container laminate structure as recited in claim 7, wherein said at least one polyolefin polymer layer is first outer and second inner layers.

11. A container laminate structure consisting essentially of:

a paperboard substrate having inner and outer surfaces; a linear low density polyethylene or a blend thereof, coated on said outer surface of said substrate;

a polyamide polymer layer disposed on said inner surface of said substrate to provide mechanical strength and thermal resistance and improve durability to said laminate;

a tie layer disposed on an inner surface of said polyamide polymer layer;

first outer and second inner layers of polyolefin polymer on an inner surface of said tie layer;

a second tie layer disposed on an inner surface of said second inner layer;

a layer of high barrier ethylene vinyl alcohol copolymer disposed on an inner surface of said second tie layer, said high barrier ethylene vinyl alcohol is 29 mole % ethylene comonomer disposed interior to said polyamide polymer layer, for preventing scalping of flavor oil from contents of said container and provide a low permeability oxygen barrier, said layer of high barrier ethylene vinyl alcohol copolymer having a coating weight between 0.5–4 lbs. per 3,000 square feet; and a thin tie layer coated on an inner surface of said high barrier ethylene vinyl alcohol copolymer layer and a thin polyolefin layer coated on said thin tie layer to form an inner surface of said container, and enable skiving of side seams of said container and sterilizing of said laminate with hydrogen peroxide.

12. A container laminate structure as recited in claim 1, wherein said polyamide polymer is chosen from the group consisting of: NYLON 6, NYLON 66, NYLON 6–12, NYLON 10, NYLON 12, and amorphous nylons.

* * * * *